J. J. CHAPMAN.
CIRCUIT CLOSER FOR DRIP PAN ALARMS.
APPLICATION FILED MAY 9, 1916.
1,220,954.
Patented Mar. 27, 1917.
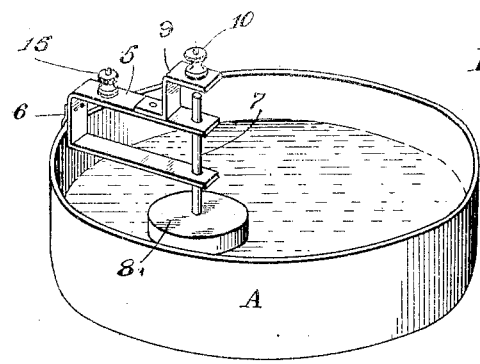
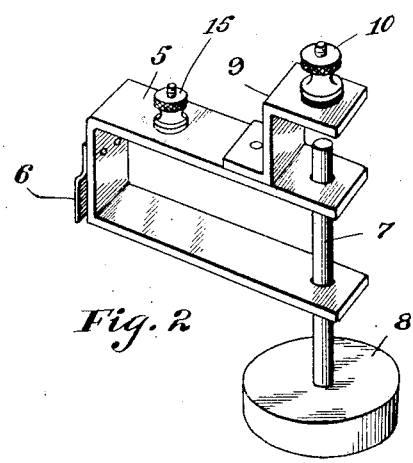
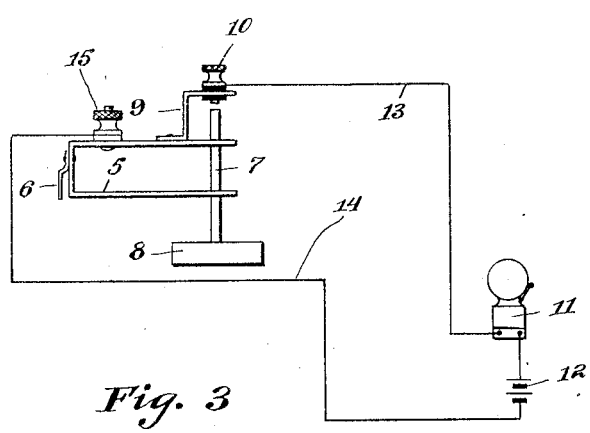
Inventor,
James Jinnings Chapman
Witnesses
C. F. Rudolph
By Victor J. Evans
Attorney

UNITED STATES PATENT OFFICE.

JAMES JINNINGS CHAPMAN, OF INDIANOLA, MISSISSIPPI.

CIRCUIT-CLOSER FOR DRIP-PAN ALARMS.

1,220,954.  Specification of Letters Patent.  Patented Mar. 27, 1917.

Application filed May 9, 1916. Serial No. 96,410.

*To all whom it may concern:*

Be it known that I, JAMES JINNINGS CHAPMAN, a citizen of the United States, residing at Indianola, in the county of Sunflower and State of Mississippi, have invented new and useful Improvements in Circuit-Closers for Drip-Pan Alarms, of which the following is a specification.

The invention relates to a drip pan alarm, and has for its primary object to provide a device of this character wherein the same can be readily hung upon the drip pan and on the filling thereof with water to a predetermined height the alarm will be sounded, thus indicating the fact that the pan has become filled, thereby eliminating the necessity of watching the pan to avoid the overflowing of water therefrom.

Another object of the invention is the provision of an alarm of this character wherein the construction thereof is novel in form so that it can be readily attached to or removed from the drip pan which is placed beneath a refrigerator for receiving the drippings from the ice.

A further object of the invention is the provision of an alarm of this character which is extremely simple in construction, thoroughly reliable and efficient in its purpose, strong, durable and inexpensive of manufacture.

Other objects will be in part obvious and in part hereinafter set forth.

The invention accordingly consists in the features of construction, combination of elements and arrangement of parts which will be exemplified in the construction hereinafter described, and the scope of the application of which will be indicated in the appended claim.

In the accompanying drawings:

Figure 1 is a perspective view of a drip pan showing the alarm connected thereto and the electric circuit normally open;

Fig. 2 is a perspective view of the bracket supporting the floating circuit closer;

Fig. 3 is a diagrammatic view showing the circuit, battery, signal bell and other adjunct parts of the device.

Similar reference characters indicate corresponding parts throughout the several views of the drawing.

Referring to the drawing in detail, A designates generally a drip pan adapted to be placed beneath a refrigerator so as to catch the drippings from the ice when placed therein and is of the ordinary well known construction. Upon this pan A is adapted to be detachably mounted the alarm hereinafter fully described.

The alarm comprises a substantially U-shaped frame 5 preferably made from a single piece of material and has on its closed end a resilient clip 6 which detachably engages the side wall of the pan A for the mounting of the bracket thereon so that the limbs of said bracket will overhang the space to be occupied by the water caught within the pan. In the limbs of the frame 5 is loosely mounted a stem 7 carrying at its lower end a float or buoyant element 8, which is adapted to ride upon the surface of the water within the pan A and rises as the water fills the pan for a purpose presently described. Formed on the bracket 5 is an L-shaped extension 9, one portion of which overhangs the upper end of the stem 7 and in alinement with the latter is a contact 10 which is fastened to the extension 9 and insulated therefrom. Adapted to be fastened upon the body of the refrigerator at any desirable point is an electric bell 11 which is arranged within a normally open electric circuit including a battery 12 which is placed at any suitable point contiguous to the refrigerator. The terminals of the current wires 13 and 14 of the normally open electric circuit are connected in any suitable manner to the contact 10 and a contact 15 respectively, the latter contact being mounted upon the frame 5. The stem 7 is adapted to engage with the contact 10 on the rising of the water to a predetermined level and thereby close the electric circuit for the sounding of the bell 11, thus indicating that the pan has been substantially filled with water so that it may be emptied. When the stem 7 of the float 8 is out of contact with the contact 10 the electric circuit is open so that the bell is silent.

From the foregoing description, taken in connection with the accompanying drawing, the construction and operation of the herein described alarm will be readily apparent and, therefore, a more extended explanation has been omitted.

Having thus described my invention, I claim:

A circuit closer for drip pan alarms comprising a U-frame, having the arms thereof vertically alined, a float having a stem slidably movable through the arms of the frame, an extension member secured to the upper arm of the frame and having one portion thereof overlying the stem of the float, a clip secured to the end of the frame remote from the stem mounting to provide with the frame a means for engaging the edge of the drip pan to support the frame within the drip pan, and alarm circuit terminals secured to the frame and extension member respectively, the latter terminal being insulated from the member and presenting a contact point to be engaged by the end of the stem at the upward limit of movement of the latter, under the influence of the float.

In testimony whereof I affix my signature.

JAMES JINNINGS CHAPMAN.